United States Patent [19]

Sugiyama et al.

[11] 4,408,312

[45] Oct. 4, 1983

[54] ROTARY RECORDING MEDIUM REPRODUCING APPARATUS WITH A TRACKING CONTROL DEFEATING CIRCUIT FOR RAPID TRACK ACCESS

[75] Inventors: Hiroyuki Sugiyama, Isehara; Isami Kaneda; Ryozo Abè, both of Yokohama; Susumu Sakakibara, Sagamihara; Yasushi Sano, Yamato, all of Japan

[73] Assignee: Victor Company of Japan, Ltd., Yokohama, Japan

[21] Appl. No.: 303,982

[22] Filed: Sep. 21, 1981

[30] Foreign Application Priority Data

Sep. 22, 1980 [JP] Japan .............................. 55-131904

[51] Int. Cl.$^3$ ...................... G11B 21/08; G11B 21/10; H04N 5/76
[52] U.S. Cl. ..................................... 369/43; 358/342; 369/32; 369/126
[58] Field of Search .................................... 369/43–46, 369/126, 32–33, 41; 358/312, 322, 338, 342; 360/77–78, 10.1–10.2

[56] References Cited

U.S. PATENT DOCUMENTS 3,854,015 12/1974 Janssen .................................. 358/342
3,911,211 10/1975 Rennick ................................ 358/342
4,322,748 3/1982 Tatsuguchi ............................ 369/43

OTHER PUBLICATIONS

Japanese Abstracts of Patents vol. 4, No. 62, P-10, (544), May 9, 1980, p. 145P10.

Patents Abstracts of Japan, vol. 2, No. 143, Nov. 15, 1978, p. 8989E78.

*Primary Examiner*—Raymond F. Cardillo, Jr.
*Attorney, Agent, or Firm*—Louis Bernat

[57] ABSTRACT

A rotary recording medium reproducing apparatus reproduces a rotary recording medium in which one and the other of first and second reference signals are alternately recorded every track turn between each track turn of a main information signal track. The reproducing apparatus comprises a reproducing transducer having a reproducing element for reproducing the main information signal and the first and second reference signals at both sides of the main information signal track from said rotary recording medium, where the reproducing transducer has a tracking control mechanism for controlling tracking of the reproducing element, a separation circuit for respectively separating the first and second reference signals from a signal reproduced by the reproducing transducer, a wave detection circuit for respectively wave-detecting the separated reference signals, a time constant circuit for eliminating an unwanted component of an output signal of the wave detection circuit and holding a required signal, a tracking control signal applying circuit for obtaining a tracking control signal from an output signal of the time constant circuit and applying the tracking control signal to the tracking control mechanism of the reproducing transducer, and an interrupting circuit provided at a stage before the time constant circuit, for interrupting transmission of the reproduced reference signals during a mode in which a tracking control operation is not performed.

5 Claims, 4 Drawing Figures

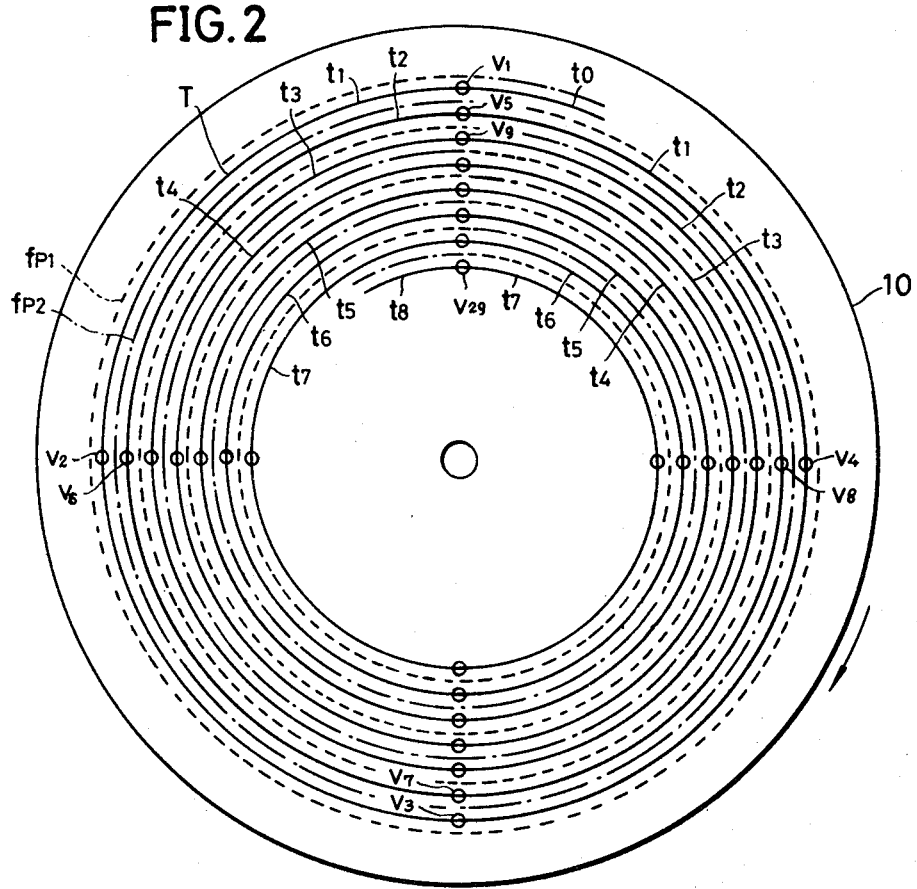

ROTARY RECORDING MEDIUM REPRODUCING APPARATUS WITH A TRACKING CONTROL DEFEATING CIRCUIT FOR RAPID TRACK ACCESS

BACKGROUND OF THE INVENTION

The present invention generally relates to rotary recording medium reproducing apparatuses, and more particularly to a rotary recording medium reproducing apparatus which puts a tracking control system in a nonoperational state during a mode such as a search mode in which tracking of a reproducing element is not required.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking control signal from the reproduced first and second reference signals.

Since no grooves are provided in the above disc, the reproducing stylus can be transferred from one track to another without damaging the reproducing stylus or the disc. Accordingly, in addition to the special reproduction such as still reproduction, slow-motion reproduction, and quick-motion reproduction, the system is capable of performing a so-called random access such as a high-speed search in which the reproducing stylus is transferred to a desired position at high speed to reproduce the desired information.

However, when a tracking control system is left in an operational state during a random access mode in which a reproducing transducer having the above reproducing stylus is transferred at a high speed, the reproducing stylus is controlled to trace over one track to the limit of resiliency of a resilient support member which supports a cantilever provided with the reproducing stylus, as a reproducing transducer main body is transferred. When the deformation of the resilient support member exceeds the limit of resiliency, the reproducing stylus follows the reproducing transducer main body which is being transferred due to the resilient force to skip over a plurality of tracks, and is again controlled so as to trace over one track. The above operation is repeatedly performed, and as a result, the resilient support member is deformed to the limit of resiliency and restored repeatedly within a substantially short period. Accordingly, the resilient support member is easily damaged due to wear. Moreover, since the reproducing stylus is instantaneously swung after being inclined to trace the tracks, the reproducing stylus is also quickly damaged due to wear.

During the above random access mode, there is no need to reproduce the main information signal such as the video signal, since the only requirement is for the reproducing transducer to reach a desired position on the disc at a high speed. Hence, there is no need to perform tracking control operation, during the above random access mode. Even when the tracking control operation is not performed, for example, a chapter address signal recorded at vertical synchronizing signal positions can be reproduced once for every some number of tracks. Accordingly, random access and the like in which the reproducing stylus is transferred to a target position by use of the reproduced address signal, can be positively performed.

Therefore, during a mode such as a random access mode, it is desirable not to perform the tracking control operation, in order to prevent premature wear of the above reproducing stylus and the resilient support member.

In a previously devised rotary recording medium reproducing apparatus for realization, a switch circuit for muting is provided in a circuit system which supplies a tracking control signal obtained by use of the reproduced first and second reference signals fp1 and fp2 to a tracking control coil of the reproducing transducer. Accordingly, in this reproducing apparatus, the above switch circuit is opened by a muting signal obtained from a micro-computer during a random access mode, to interrupt the supply of the tracking control signal with respect to the tracking control coil.

On the other hand, the above circuit system for obtaining the tracking control signal from the first and second reference signals comprises, a wave detection circuit for respectively and independently wave-detecting the first and second reference signals, a changeover circuit for alternately changing over the reproduced first and second reference signals every one revolution of the disc to supply the reference signal to the wave detection circuit, a time constant circuit connected to an output side of the wave detection circuit, and a differential amplifier supplied with an output of the time constant circuit for producing a control signal according to a level difference. The above switch circuit for muting is connected to an output side of the differential amplifier. The above time constant circuit consists of a lowpass filter for eliminating an unwanted signal component within an output signal of the wave detection circuit, and a circuit for holding the wave detected output obtained with a horizontal scanning period. Concretely, the above time constant circuit is constructed from resistors and a capacitor.

However, upon starting of a random access mode, even when the above switch circuit for muting is opened in order to interrupt the tracking control signal, a large error voltage remains within the time constant circuit since the capacitor of the above time constant circuit continues to be charged. Accordingly, after the above random access is performed and the reproducing transducer has reached a desired position, when the above switch circuit is closed in order to perform normal reproduction from that position maintaining tracking control, an unwanted control signal which is formed according to the large charged voltage left within the time constant circuit is applied to the tracking control coil. Since the charged voltage before closing of the switch circuit is substantially different from a voltage corresponding to tracking control after completion of the random access operation, even in a case where the reproducing stylus stops at the correct position, the reproducing stylus is shifted from the correct position due to the above unwanted control signal. Therefore, there was a disadvantage in that a certain time was required until the correct tracking control signal is obtained to perform the correct tracking operation.

Furthermore, by the above circuit construction, a plurality of circuit elements are required due to the switch circuit for muting which is provided. In addition, there was a disadvantage in that an output port exclusively for the muting signal was required in the micro-computer.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus provided with an interrupting circuit for interrupting a transmission path of first and second reference signals at a stage before a time constant circuit in a circuit system which forms a tracking control signal from the reproduced first and second reference signals. According to the apparatus of the present invention, when an interrupting operation is performed by the above interrupting circuit during a mode such as a random access mode in which a tracking control operation is not performed, an unwanted charging operation is not performed within the time constant circuit. Hence, when the tracking control operation is to be performed again after completion of the random access operation and the like, the above tracking control operation can be performed immediately and accurately.

Still another object of the present invention is to provide a rotary recording medium reproducing apparatus which puts a changeover circuit for changing over the reproduced first and second reference signals and supplying the reference signal to a wave detection circuit during a mode such as the random access mode in a substantially interrupted state. According to the apparatus of the present invention, there is no need to provide a changeover circuit exclusively for muting, and the construction of the circuit can be simplified.

Other objects and further features of the present invention will be apparent from the following detailed description when read in conjunction with the accompanying drawings.

BRIEF DESCRIPTION OF THE DRAWINGS

FIG. 2 is a diagram for explaining the recorded state of reference signals on a track pattern on a rotary recording medium;

DETAILED DESCRIPTION

Figure 1:
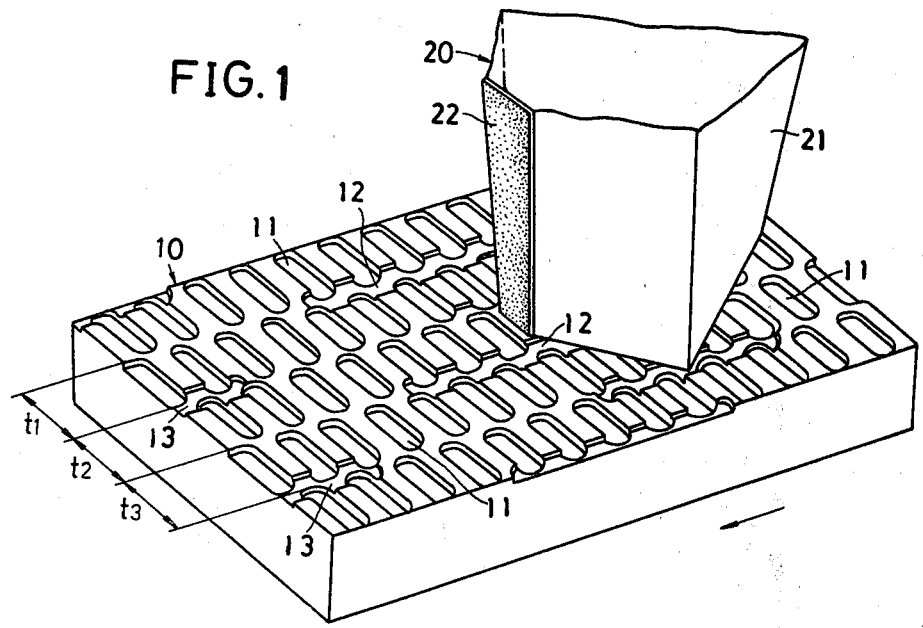
FIG. 1 is a perspective view showing a part of a rotary recording medium in an enlarged state together with a tip end part of a reproducing stylus.

First, description will be given with respect to a rotary recording medium which is reproduced by a rotary recording medium reproducing apparatus to which the periodical signal detection circuit according to the present invention can be applied, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1$, $t_2$, $t_3$. As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, it pits 12 and 13 are respectively formed on the right and left sides of one track turn, for example, pits 13 and 12 are respectively formed on the right and left sides of each of the adjacent track turns.

As indicated in FIG. 2, a video signal is recorded along a spiral track T of the disc 10 for two frames, that is, four fields, per one revolution of the disc. In FIG. 2, the tracks of the reference signal fp1 is shown by dotted lines while the tracks of the reference signal fp2 is shown by one-dot chain lines. The positions of the vertical synchronizing signals of respective fields are designated by reference characters V1, V2 V3, . . . and the successive track parts corresponding to one revolution of the disc of a single spiral track I are respectively designated by track turns $t_1$, $t_2$, $t_3$. Furthermore, a third reference signal fp3 is recorded at the starting end positions V1, V5, V9, . . . of each track turns $t_1$, $t_2$, $t_3$, . . . , that is, at positions where the reference signals fp1 and fp2 change over.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
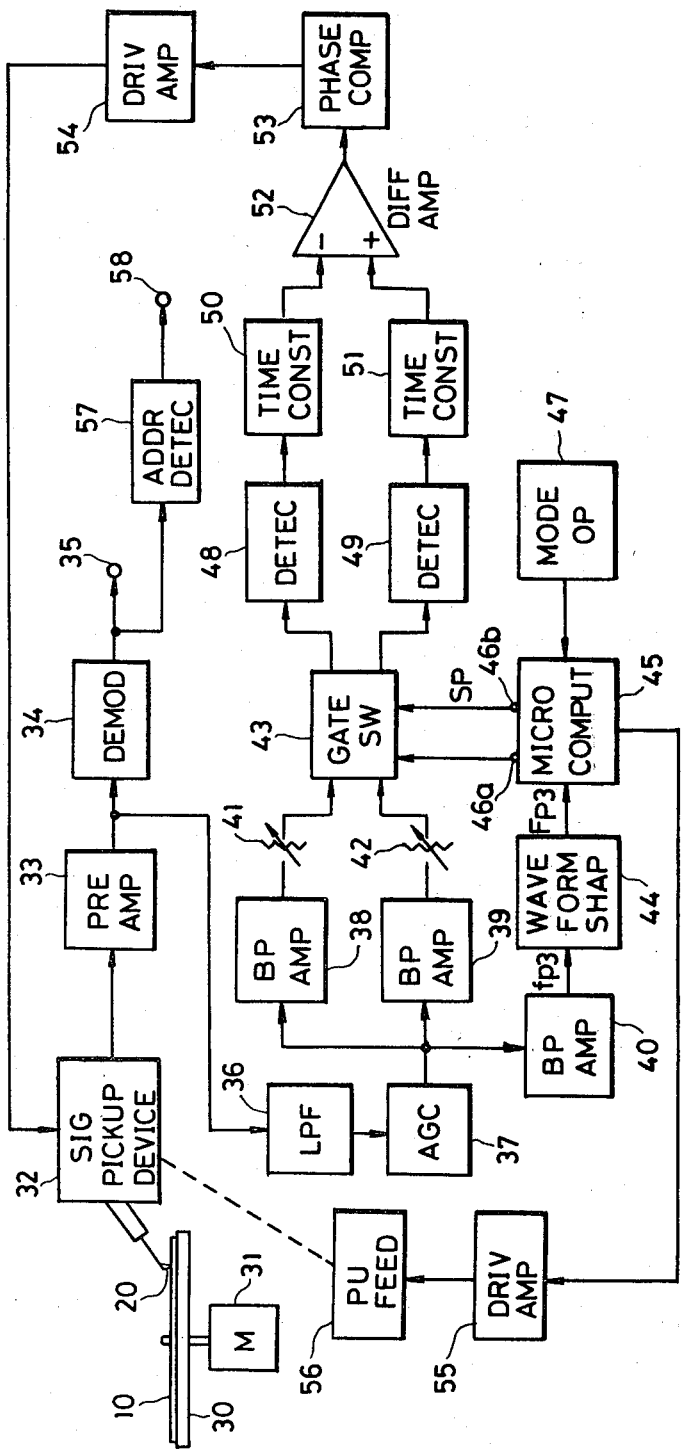
FIG. 3 is a systematic block diagram showing an embodiment of a rotary recording medium reproducing apparatus according to the present invention.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signals are adjusted. The resulting signals are then supplied to a gate switching circuit 43.

The reference signal fp3 separated and amplified at the above band-pass amplifier 40, is supplied to a waveform shaping circuit 44 comprising a Schmitt circuit. The signal thus supplied to the waveform shaping circuit 44 undergoes waveform-shaping so that the signal is not affected by noise and other influences. The reference signal fp3 thus subjected to the waveform-shaping, is supplied to a micro-computer 45. The micro-computer produces signals from output ports 46a and 46b according to a mode set at a mode setting operation part 47, and supplies these signals to the gate switching circuit 43.

When the mode set by the operation part 47 is a normal reproduction mode (including reproduction of an arbitrary speed from a normal reproduction mode to a 65-times speed quick-motion reproduction, in the present embodiment of the invention), a switching signal SP which will be described hereinafter is produced through the output ports 46a and 46b of the micro-computer 45 and supplied to the gate switching circuit 43.

The gate switching circuit 43 performs switching of the reference signals fp1 and fp2 every one revolution period of the disc 10 upon normal reproduction, in response to the above switching pulse SP applied thereto. Hence, due to the switching pulse SP which reverses polarity every two frames (1/15 seconds), the reference signals fp1 and fp2 are always alternately supplied to detection circuits 48 and 49 with predetermined polarities, from the gate switching circuit 43.

The detection circuits 48 and 49 detect the envelopes of their respective input reference signals, and convert the input reference signals into DC voltages. These DC voltages are then respectively supplied to time constant circuits 50 and 51 consisting of a lowpass filter and holding circuit, wherein the DC voltages are eliminated of unwanted noise components and held. Outputs of the above time constant circuits 50 and 51 are respectively supplied to a differential amplifier 52. The differential amplifier 52 compares the output signals of the two detection circuits 48 and 49 which vary in response to the reproduced levels of the reference signals fp1 and fp2, and generates an output tracking error signal which indicates the tracking error direction and the error quantity. This error signal passes through a phase compensation circuit 53 and is further amplified to a specific level by a driving amplifier 54.

An output signal of the driving amplifier 54 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

Moreover, during the normal reproduction mode, a signal corresponding to this mode is supplied to a pickup feed mechanism 56 from the micro-computer 45, through a driving amplifier 55. Hence, the signal pickup device 32 is transferred along the radial direction of the disc 10 with a normal speed, by the feed mechanism 56.

Figure 4:
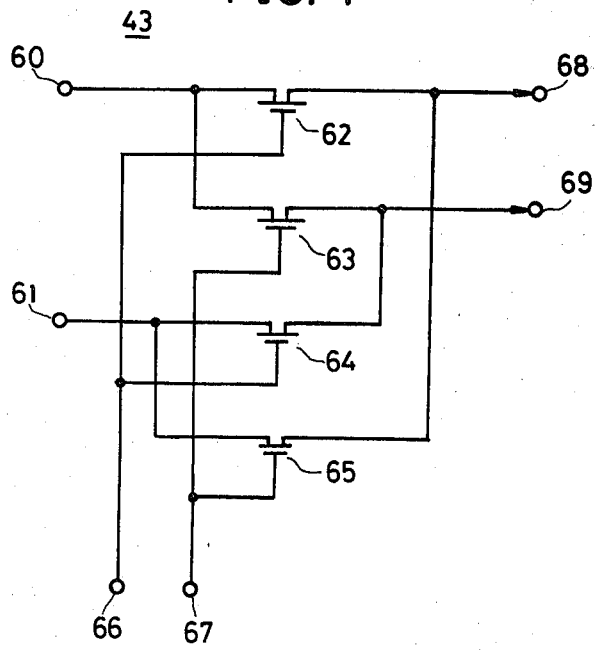
FIG. 4 is a circuit diagram showing an embodiment of a gate switching circuit within the block system shown in FIG. 3.

The gate switching circuit 43 has a circuit construction as shown in FIG. 4, for example. The first and second reference signals fp1 and fp2 obtained from the amplifiers 38 and 39 are respectively supplied to input terminals 60 and 61 of the gate switching circuit 43, through the level adjustors 41 and 42. Field-effect-transistors (FETs) 62 and 63 are respectively connected to the input terminal 60, while FETs 64 and 65 are respectively connected to the input terminal 61. The above FETs 62 and 65 are connected to an output terminal 68 which is connected to the detection circuit 48, and the FETs 63 and 64 are connected to an output terminal 69 which is connected to the detection circuit 49. In addition, an output control signal obtained from the output port 46a of the micro-computer 45, is applied to the gate terminals of the FETs 62 and 64 through a terminal 66. On the other hand, an output control signal obtained from the output port 46b of the micro-computer 45 is applied to the gate terminals of the FETs 63 and 65 through a terminal 67.

During the normal reproduction mode, the microcomputer 45 produces a signal which is a combination of a high-level (H-level) signal and a low-level (L-level) signal and a signal which is a combination of a L-level signal and a H-level signal, in an alternate manner every time the reproduced reference signal fp3 is supplied thereto, from the output ports 46a and 46b according to the reproduced reference signal fp3. For example, when a H-level signal and a L-level signal are respectively produced through the output ports 46a and 46b of the micro-computer 45, the FETs 62 and 64 are turned ON, while the FETs 63 and 65 are turned OFF. Accordingly, the first and second reference signals from the input terminals 60 and 61 are lead through the FETs 62 and 64 as they are to the output terminals 68 and 69, and then supplied to the detection circuits 48 and 49. Next, when the disc 10 undergoes one revolution and the next third reference signals fp3 is reproduced, a L-level signal and a H-level signal are respectively produced through the output ports 46a and 46b. Therefore, the FETs 63 and 65 are turned On while the FETs 62 and 64 are turned OFF. Thus, at this point in time, the first and second reference signals from the input terminals 60 and 61 are lead to the output terminals 69 and 68 through the FETs 63 and 65, and then supplied to the detection circuits 49 and 48. Thereafter, the above described operation is repeated for every one revolution of the disc 10.

Next, a random access mode is set at the operation part 47, and the address of the desired position subject to the access is set. By this operation, a high-speed search or an intermediate-speed search signal is supplied to the feed mechanism 56 from the micro-computer 45 through the driving amplifier 55. Hence, the signal pickup device 32 is transferred at a high speed or an intermediate speed. Moreover, an address signal is detected from within the output signal of the demodulator 34, at an address detection circuit 57. The above address signal thus obtained, is supplied to the micro-computer 45 through an output terminal 58. The random access operation is performed until the reproduced address and the set address coincide.

During the above random access mode, the micro-computer 45 produces L-level signals through the output ports 46a and 46b. These L-level signals obtained from the output ports 46a and 46b are supplied to the gate terminals of the FETs 62 through 65 of the gate switching circuit 43, through the terminals 66 and 67. Therefore, all the FETs 62 through 65 are turned OFF, and the gate switching circuit 43 is put into an interrupted state.

Accordingly, during the random access mode, the reproduced first and second reference signals fp1 and fp2 are interrupted at the gate switching circuit 43, and are not supplied to the detection circuits 48 and 49 or to the time constant circuits 50 and 51. Hence, unwanted and excessive charge is not introduced in the capacitor within the time constant circuits 50 and 51, during the random access mode.

Thus, as the operational mode of the reproducing apparatus changes from the random access mode to the normal reproduction mode, the gate switching circuit 43 again performs the changeover operation by use of the switching signal SP obtained from the output ports 46a and 46b. The reproduced first and second reference signals fp1 and fp2 obtained from the amplifiers 38 and 39 are supplied to the detection circuits 48 and 49. At this point in time, the time constant circuits 50 and 51 are not excessively charged. Therefore, the tracking control signal can be obtained from the differential amplifier 52 within a substantially short period of time after changing of the operational mode to the normal reproduction mode.

In FIG. 3, the detection circuits 48 and 49, and the time constant circuits 50 and 51 are respectively shown by different blocks. However, the above time constant circuits 50 and 51 can be assembled within the detection circuits 48 and 49.

The period in which the gate switching circuit 43 is put into the interrupted state, is not limited for the duration of the random access mode, and can be during a mode in which the reproducing stylus is raised. That is, the above gate switching circuit 43 is put into the interrupted state during a mode in which it is unnecessary to perform the tracking control operation.

Accordingly, according to the reproducing apparatus of the present invention, the reproduced reference signals are interrupted at a stage before the time constant circuit during a mode in which there is no need to perform a tracking control operation. Hence, unwanted and excessive charge voltage is not introduced in the time constant circuit during an interval in which the tracking control operation is not performed. When the operational mode is again changed to a mode in which the tracking control operation must be performed, the tracking control operation can immediately and accurately be performed.

The circuit for interrupting the transmission of the reproduced reference signals can be provided at any position, as long as the circuit is provided at a stage before the time constant circuit. However, in the present embodiment of the invention, there is no need to provide a special interrupting circuit since the gate switching circuit is used on common with the interrupting circuit. Therefore, the present embodiment of the invention is a preferable embodiment in that the circuit construction can be simplified.

Further, the present invention is not limited to these embodiments, but various variations and modifications may be made without departing from the scope of the present invention.

What is claimed is:

1. A reproducing apparatus for reproducing a rotary recording medium in which one and the other of first and second reference signals are alternately recorded on every track turn, the reference signals being recorded between each track turn of a main information signal track, said rotary recording medium having a third reference signal recorded thereon at positions corresponding to the positions where the recording of said first and second reference signals are alternately changed over every said track turn, said reproducing apparatus comprising:

reproducing transducer means having a reproducing element for reproducing said main information signal and the first and second reference signals at both sides of said main information signal track, said reproducing transducer having means for controlling the tracking of said reproducing element;

separation circuit means for respectively separating said first and second reference signals from a signal reproduced by said reproducing transducer means;

wave detection circuit means for respectively wave-detecting said separated reference signals;

time constant circuit means for eliminating an unwanted component in an output signal of said wave detection circuit means and for holding a required signal;

tracking control signal applying circuit means for obtaining a tracking control signal from an output signal of said time constant circuit means and for applying the tracking control signal to the tracking control means of said reproducing transducer;

interrupting circuit means at a stage before said time constant circuit means, for interrupting the transmission of said reproduced reference signals during a mode in which a tracking control operation is not performed;

circuit means for separating the third reference signal from the signal reproduced by said reproducing transducer means;

switching signal forming circuit means for forming a switching signal in response to said separated third reference signal; and changeover circuit means responsive to the switching signal supplied from said switching signal forming circuit means, for alternately changing over and supplying said separated first and second reference signals to said detection circuit means, said switching signal forming circuit means putting said changeover circuit means in a signal transmission interrupting state during the mode in which the tracking control operation is not performed.

2. A reproducing apparatus as claimed in claim 1 in which said changeover circuit means comprises switching elements which are turned ON or OFF according to the level of a signal applied from said switching signal forming circuit means, and said switching signal forming circuit means applies a signal to said switching elements having a level such that said switching elements are all turned OFF, during the mode in which the tracking control operation is not performed.

3. A reproducing apparatus as claimed in claim 1 in which said changeover circuit means comprises first and second switching elements supplied with said separated first reference signal and third and fourth switching elements supplied with said separated second reference signal, said first and fourth switching elements being connected to one detection circuit means and said second and third switching elements being connected to another detection circuit means, said switching signal forming circuit means having two output ports wherein a first output port is connected to switching control terminal of said first and third switching elements and a second output port is connected to a switching control terminal of said second and fourth switching elements, and said switching signal forming circuit means alternately produces signals of high level and low level and signals of low level and high level respectively through said first and second output ports upon completion of each revolution period of the rotary recording medium.

4. A reproducing apparatus as claimed in claim 3 in which said switching signal forming circuit means produces low level signals respectively through said first and second output ports during the mode in which the tracking operation is not perfomed, and each of said first through fourth switching elements is turned OFF responsive to a low-level signal.

5. A reproducing apparatus as claimed in claim 4 which further comprises transferring means for transferring said reproducing transducer means over said rotary recording medium, in which said switching signal forming circuit means comprises a micro-computer for producing signals having levels which are in accordance with a set mode through output ports, and said micro-computer controls said transferring means so that said reproducing transducer means is transferred at a speed which is in accordance with said set mode.

* * * * *